United States Patent
Watabe et al.

[15] 3,678,687
[45] July 25, 1972

[54] SEALING MEANS BETWEEN MASTER CYLINDER AND BRAKE BOOSTER

[72] Inventors: Shigeru Watabe, Kariya; Atsushi Ohmi, Nagoya, both of Japan

[73] Assignee: Aisin Seiki Kabushiki Kaisha, Kariya Aichi Pref., Japan

[22] Filed: Oct. 23, 1970

[21] Appl. No.: 83,535

[30] Foreign Application Priority Data

Oct. 24, 1969 Japan..................................44/101531

[52] U.S. Cl..........................................................60/54.6 P
[51] Int. Cl..........................................F15b 7/06, F16j 15/56
[58] Field of Search....................92/168; 60/54.6 P; 277/208, 277/70, 75, 79, 25

[56] References Cited

UNITED STATES PATENTS

| | | | |
|---|---|---|---|
| 3,559,406 | 2/1971 | Gardner | 60/54.6 P |
| 3,564,849 | 2/1971 | Huruta et al. | 60/54.6 P |
| 2,988,148 | 6/1961 | Conrad et al. | 277/70 |
| 2,997,027 | 8/1961 | Ingres | 60/54.6 P |
| 3,017,866 | 1/1962 | Stelzer | 60/54.6 P |
| 3,026,852 | 3/1962 | Stelzer | 60/54.6 P |

*Primary Examiner*—William F. O'Dea
*Assistant Examiner*—Robert J. Smith
*Attorney*—Pierce, Scheffler & Parker

[57] ABSTRACT

A sealing member for preventing liquid entrance into the master cylinder housing from the clearance of the connecting portion between the master cylinder housing and the brake booster housing, said sealing member being formed in a tubular shape and fitted on a sleeve of the master cylinder housing, comprising an axial projection normally making contact with the booster housing, and an air compensating slot.

4 Claims, 3 Drawing Figures

Patented July 25, 1972 — 3,678,687

SEALING MEANS BETWEEN MASTER CYLINDER AND BRAKE BOOSTER

This invention relates to sealing means between two members, and more particularly to sealing means between the master cylinder and the brake booster for use on an automotive vehicle.

An object of the invention is to provide a sealing member which can prevent liquid entrance through a clearance of the connecting portion between the master cylinder and the brake booster, said liquid being admitted from the radiator-grille or the engine room which houses the master cylinder and the brake booster.

Another object of the invention is to provide a sealing means which is simple in construction and economical in manufacture.

These and other objects and advantages of the invention will become apparent from the following description together with the drawings, in which.

Figure 3:
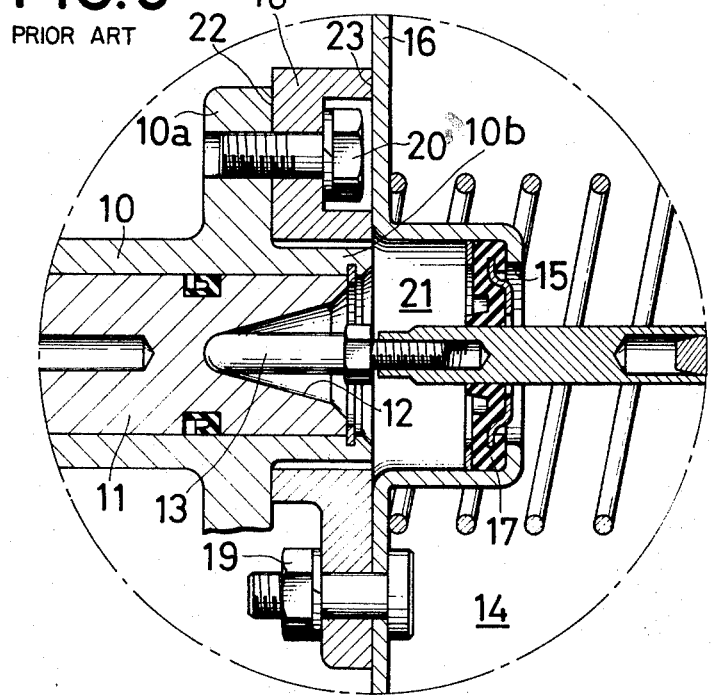
FIG. 3 is a view similar to FIG. 2, but showing a conventional connecting portion.

Referring at first to FIG. 3, there is illustrated a conventional connection between the master cylinder and brake booster in which the numeral 10 denotes a master cylinder housing sealingly and slidingly fitting a hydraulic piston 11 therein. The master cylinder housing 10 comprises a radial flange 10a and an axial sleeve 10b. The right hand end of the piston 11 is formed with a deep axial recess 12 the apex of which is kept in pressure contact with the inner end of a push rod 13, said push rod being mechanically connected with a conventional brake booster 14 through an opening 15 of a booster housing 16 and an annular sealing member 17 fixed to the booster housing, said sealing member being provided for prevention of water leakage to the booster 14. A spacer 18 is provided between the master cylinder housing 10 and the booster housing 16 for rigid connection therebetween. The master cylinder housing 10 is fixed to the spacer 18 by first screw bolts 20, while the booster housing 16 is fixed thereto by second screw bolts 19.

The water entering from the engine room or radiator-grille (not shown) will be admitted to a central depression or chamber 21 of the booster housing 16 through a gap 22 between the master cylinder housing 10 and spacer 18 or a gap 23 between the booster housing 16 and spacer 18. The water having entered the depression 21 will be admitted into the master cylinder housing, resulting in generation of rust on the sliding surfaces between the master cylinder housing 10 and hydraulic piston 11. Thus the sliding movement of the hydraulic piston 11 becomes irregular.

Figure 1:
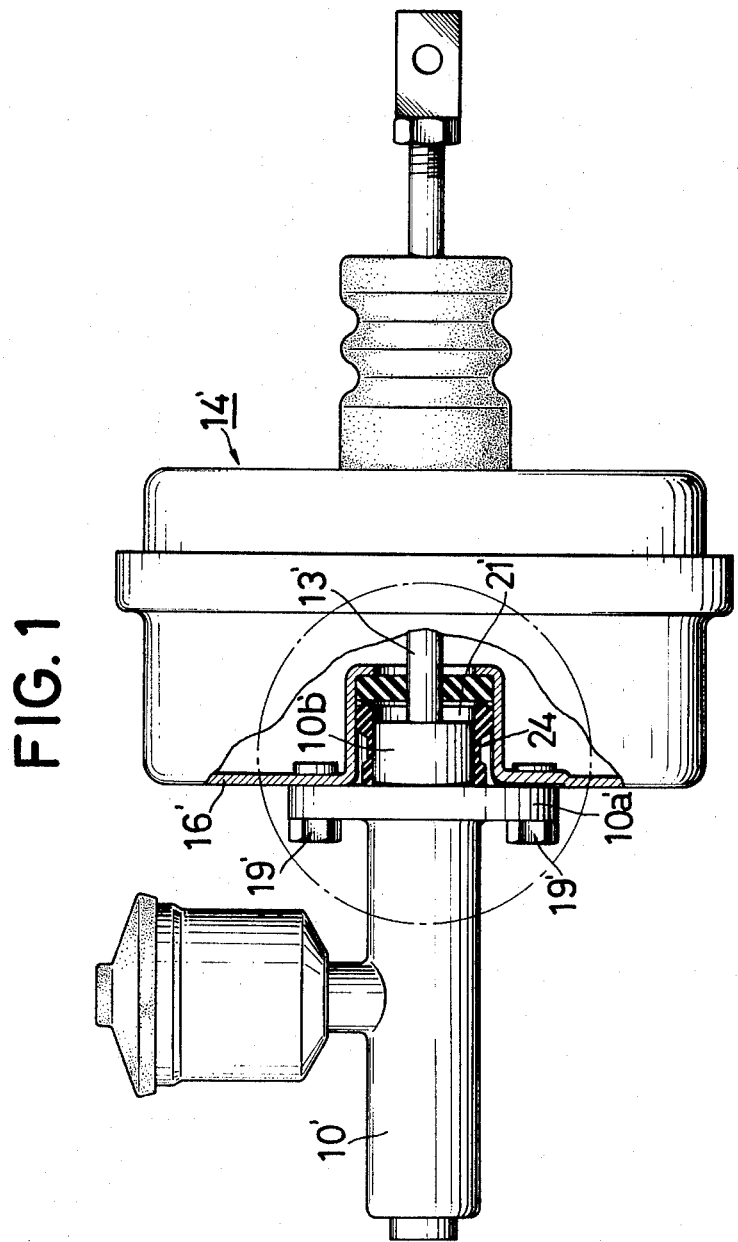
FIG. 1 is an elevational view partly in section of the master cylinder and brake booster in their installation incorporating a sealing means in accordance with this invention.
Figure 2:
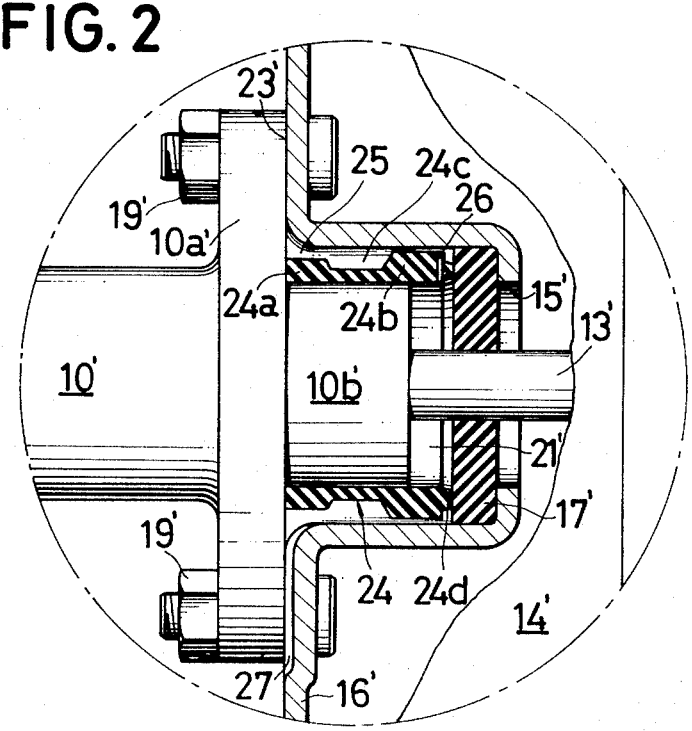
FIG. 2 is an enlarged view of the connecting portion encircled in FIG. 1.

In FIGS. 1 and 2, sealing means between the master cylinder housing and booster housing is shown in which the same structure as in the conventional form is designated with primes (') affixed thereto.

A master cylinder housing 10' is fixed to a booster housing 16' by set screws 19'. A push rod 13' of a conventional brake booster 14' is operatively connected to a hydraulic piston (not shown) slidably fitted within the master cylinder housing 10' through an opening 15' of the booster housing, a sealing member 17' and a chamber 21'. Around a sleeve 10b' of the master cylinder housing 10', there is securely fitted a tubular seal 24 comprising shoulders 24a and 24b at each end thereof which will form a groove 24c therebetween. There is provided a radial gap 25 between the booster housing 16' and the tubular sealing member 24. The tubular member 24 further comprises an axial projection 24d adapted to normally make contact with the annular sealing member 17'. On the shoulder 24b is provided a radial slot 26 for pneumatic communication between the gap 25 and the chamber 21', said slot being positioned in the upper part upon assembly. Because of the provision of said air communicating slot 26, generation of vacuum in the chamber 21' causing deformation of the annular seal 17' is prevented, upon actuation of the booster mechanism 14' which will cause the push rod 13' to move towards left of FIG. 1 in the conventional boosting way.

In case the water enters the radial gap 25 through a clearance 23' between the flange 10a' of master cylinder housing and the booster housing 16', admission of said water to the chamber 21', i.e., to the slide surfaces between the hydraulic piston and the master cylinder housing will be prevented by virtue of the tubular sealing member 24. The water will pass to the outside through a hollow 27 provided on the booster housing 16'. It will be seen that the provision of the groove 24c readily permits the water to pass to the outside.

According to the features of the invention, liquid invasion into the master cylinder housing may be prevented, whereby the brake booster or master cylinder may correctly perform its function. In addition, it is unnecessary to change the form and size of master cylinder or brake booster, and it is only necessary to provide the sealing means which is simple in form and economical in manufacture.

What is claimed is:

1. In a hydraulic braking system, the combination comprising, a master brake cylinder and piston mounted therein, a brake booster, means including a joint for securing said cylinder and said booster together and which establishes a chamber therebetween into which a sleeved end of said cylinder extends, said joint permitting air leakage from the surrounding atmosphere into said chamber, said booster being provided with a push rod extending through said chamber and into said sleeved end of said cylinder for actuating the piston of said brake cylinder, a tubular sealing member mounted on said sleeved end of said cylinder and extending therebeyond, the ends of said tubular sealing member abutting said brake cylinder and said booster in sealing relationship, the wall of the extended portion of said sealing member having an air vent passage therethrough to permit air to pass from said chamber into the sleeved end of said cylinder to equalize pressure therein when said piston is actuated.

2. A hydraulic brake system as claimed in claim 1 wherein said sealing member is provided at the outer end thereof with an annular axial projection for sealingly engaging said brake booster.

3. A hydraulic brake system as claimed in claim 1 wherein the ends of said tubular sealing member are provided with enlarged shoulder portions which define and limit a peripheral portion having an outer diameter less than the shoulder portions.

4. A hydraulic brake system as claimed in claim 1 wherein said chamber is provided with an outlet at the bottom thereof for any water that may accumulate within said chamber.

* * * * *